(12) United States Patent
Lumpkin

(10) Patent No.: US 9,156,521 B2
(45) Date of Patent: Oct. 13, 2015

(54) BICYCLE FRAME REAR SUSPENSION WITH FLEXING FRAME SEGMENT

(71) Applicant: Wayne Lumpkin, Littleton, CO (US)

(72) Inventor: Wayne Lumpkin, Littleton, CO (US)

(*) Notice: Subject to any disclaimer, the term of this patent is extended or adjusted under 35 U.S.C. 154(b) by 0 days.

(21) Appl. No.: 14/244,496

(22) Filed: Apr. 3, 2014

(65) Prior Publication Data

US 2015/0175238 A1 Jun. 25, 2015

Related U.S. Application Data

(60) Provisional application No. 61/919,833, filed on Dec. 23, 2013.

(51) Int. Cl.
| | |
|---|---|
| *B62K 25/28* | (2006.01) |
| *B62K 19/00* | (2006.01) |
| *B62K 3/02* | (2006.01) |
| *B62K 19/02* | (2006.01) |
| *B62K 19/18* | (2006.01) |
| *B62K 25/04* | (2006.01) |

(52) U.S. Cl.
CPC . *B62K 25/28* (2013.01); *B62K 3/02* (2013.01); *B62K 19/00* (2013.01); *B62K 19/02* (2013.01); *B62K 19/18* (2013.01); *B62K 25/286* (2013.01); *B62K 2025/041* (2013.01)

(58) Field of Classification Search
CPC .................. B62K 2025/041; B62K 25/286
USPC .................... 280/283, 284, 285, 286, 275
See application file for complete search history.

(56) References Cited

U.S. PATENT DOCUMENTS

| 618,627 A | * | 1/1899 | Travis ........................ 280/284 |
| 2,178,939 A | * | 11/1939 | Pease ........................ 280/283 |
| 2,283,671 A | * | 5/1942 | Finlay et al. ................ 280/284 |
| 4,838,569 A | * | 6/1989 | Ford ........................... 280/275 |
| 4,856,801 A | | 8/1989 | Hollingsworth |
| 5,080,384 A | * | 1/1992 | Groendal et al. ............ 280/275 |
| 5,098,114 A | | 3/1992 | Jones |
| 5,205,572 A | | 4/1993 | Buell et al. |
| 5,240,269 A | | 8/1993 | Kerr |
| 5,244,224 A | | 9/1993 | Busby |
| 5,284,354 A | | 2/1994 | McWethy |
| 5,301,974 A | | 4/1994 | Knapp |
| 5,320,375 A | | 6/1994 | Reeves et al. |

(Continued)

FOREIGN PATENT DOCUMENTS

| NL | 3501 | 10/1917 |
| WO | WO 2013/046236 | 4/2013 |

OTHER PUBLICATIONS

Cannondale.com (Admitted prior art) Scalpel 29 Carbon Black Inc.; Website [Online] Available Web Site: http://www.ibiscycles.com/bikes/ripley_29/; Last Update: Unknown; Accessed on Apr. 25, 2014.

(Continued)

*Primary Examiner* — Anne Marie Boehler
(74) *Attorney, Agent, or Firm* — Swanson & Bratschun, L.L.C.

(57) ABSTRACT

A bicycle frame includes a substantially rigid front frame portion and a substantially rigid rear frame portion. A link is connected to the rear frame portion by a first pivot and to the front frame portion by a second pivot. A rear frame segment is rigidly connected at a first end to the rear frame portion and pivotably connected at a second end to the front frame portion by a third pivot. The rear frame segment is flexible parallel to an axis of the third pivot.

10 Claims, 8 Drawing Sheets

(56) References Cited

U.S. PATENT DOCUMENTS

| | | | |
|---|---|---|---|
| 5,403,028 | A | 4/1995 | Trimble |
| 5,452,910 | A | 9/1995 | Harris |
| 5,474,318 | A | 12/1995 | Castellano |
| 5,553,881 | A | 9/1996 | Klassen et al. |
| 5,628,524 | A | 5/1997 | Klassen et al. |
| 5,791,674 | A | 8/1998 | D'Aluisio |
| 5,957,473 | A | 9/1999 | Lawwill |
| 6,092,823 | A * | 7/2000 | Busby ............... 280/284 |
| 6,199,886 | B1 | 3/2001 | Guenther |
| 6,293,574 | B1 | 9/2001 | Storck |
| 6,361,059 | B1 | 3/2002 | Ellsworth |
| 6,386,568 | B1 | 5/2002 | Tribotte |
| 6,406,048 | B1 | 6/2002 | Castellano |
| 6,450,520 | B1 | 9/2002 | Girard |
| 6,581,950 | B1 | 6/2003 | Ellsworth |
| 6,755,432 | B2 | 6/2004 | Muser |
| 6,783,142 | B1 * | 8/2004 | Schober ............... 280/284 |
| 6,843,494 | B2 | 1/2005 | Lam |
| 6,886,846 | B2 | 5/2005 | Carroll |
| D523,380 | S | 6/2006 | Auger et al. |
| 7,066,481 | B1 | 6/2006 | Soucek |
| 7,100,930 | B2 | 9/2006 | Saiki |
| 7,140,628 | B2 | 11/2006 | Parkin |
| 7,168,726 | B2 | 1/2007 | Klein |
| 7,216,883 | B2 | 5/2007 | O'Connor |
| 7,395,892 | B2 | 7/2008 | Alonzo |
| 7,533,895 | B2 * | 5/2009 | Beal ............... 280/276 |
| 7,635,141 | B2 | 12/2009 | O'Connor |
| 7,722,072 | B2 | 5/2010 | Hoogendoorn |
| 7,753,388 | B2 * | 7/2010 | Tolhurst ............... 280/276 |
| 7,828,314 | B2 | 11/2010 | Weagle |
| 7,837,213 | B2 | 11/2010 | Colegrove et al. |
| 7,909,347 | B2 | 3/2011 | Earle |
| 7,938,424 | B2 | 5/2011 | Arraiz |
| 7,946,605 | B2 | 5/2011 | Lane |
| 7,980,579 | B2 | 7/2011 | Bucley |
| 8,002,301 | B2 | 8/2011 | Weagle |
| 8,033,558 | B2 | 10/2011 | Earle |
| 8,061,729 | B2 | 11/2011 | White |
| 8,066,297 | B2 | 11/2011 | Beale et al. |
| 8,136,829 | B1 | 3/2012 | Kang et al. |
| 8,152,191 | B2 | 4/2012 | Huang et al. |
| 8,235,409 | B2 | 8/2012 | Colegrove et al. |
| 8,272,658 | B2 | 9/2012 | Hoogendoorn |
| 8,286,982 | B2 | 10/2012 | Plantet et al. |
| 8,348,295 | B2 | 1/2013 | Beaulieu et al. |
| 8,382,136 | B2 | 2/2013 | Beale et al. |
| 8,403,350 | B2 | 3/2013 | Talavasek et al. |
| 8,424,893 | B2 * | 4/2013 | Guillemette ............... 280/283 |
| 8,434,776 | B2 | 5/2013 | Wuthrich |
| 8,585,070 | B2 * | 11/2013 | Beale ............... 280/284 |
| 8,590,914 | B2 | 11/2013 | Domahidy |
| 2005/0285367 | A1 | 12/2005 | Chang et al. |
| 2006/0061059 | A1 | 3/2006 | Lesage et al. |
| 2006/0119070 | A1 | 6/2006 | Weagle |
| 2008/0217882 | A1 | 9/2008 | Beaulieu et al. |
| 2008/0258427 | A1 | 10/2008 | Buckley |
| 2008/0303242 | A1 | 12/2008 | O'Connor |
| 2009/0026728 | A1 * | 1/2009 | Domahidy ............... 280/284 |
| 2009/0072512 | A1 | 3/2009 | Earle |
| 2009/0250897 | A1 | 10/2009 | Tanouye et al. |
| 2009/0261556 | A1 | 10/2009 | Beale et al. |
| 2009/0261557 | A1 | 10/2009 | Beale et al. |
| 2009/0322055 | A1 | 12/2009 | Arraiz |
| 2010/0059965 | A1 | 3/2010 | Earle |
| 2010/0096831 | A1 | 4/2010 | Tanouye et al. |
| 2010/0102531 | A1 | 4/2010 | Graney et al. |
| 2010/0109282 | A1 | 5/2010 | Weagle |
| 2010/0156066 | A1 | 6/2010 | O'Connor |
| 2011/0018228 | A1 | 1/2011 | Beale et al. |
| 2011/0025015 | A1 | 2/2011 | Colegrove et al. |
| 2011/0095507 | A1 | 4/2011 | Plantet et al. |
| 2011/0227312 | A1 | 9/2011 | Earle |
| 2011/0233892 | A1 | 9/2011 | Domahidy |
| 2011/0233893 | A1 | 9/2011 | Buckley |
| 2011/0278817 | A1 | 11/2011 | Talavasek et al. |
| 2011/0291382 | A1 | 12/2011 | Plantet |
| 2012/0007327 | A1 | 1/2012 | Talavasek |
| 2012/0130591 | A1 | 5/2012 | Song et al. |
| 2012/0187653 | A1 | 7/2012 | Edgeworth et al. |
| 2012/0223504 | A1 | 9/2012 | Antonot |
| 2012/0228850 | A1 | 9/2012 | Tseng |
| 2012/0235379 | A1 | 9/2012 | Trimble |
| 2012/0280470 | A1 | 11/2012 | Colegrove |
| 2012/0326416 | A1 | 12/2012 | Talavasek |
| 2013/0093160 | A1 | 4/2013 | Alsop |
| 2013/0214507 | A1 | 8/2013 | O'Connor |
| 2013/0285346 | A1 | 10/2013 | Wimmer |
| 2014/0001729 | A1 | 1/2014 | Hudec |

OTHER PUBLICATIONS

Castellano Designs (2003) Fango; Website [Online] Available Web Site: http://www.castellanodesigns.com/fango.html; Last Update: Aug. 24, 2013; Accessed on Apr. 25, 2014.

Felt Bicycles (2013) Felt Suspension Technology; Website [Online] Available Web Site: http://www.feltbicycles.com/assest_img/technology_docs/Suspension.pdf; Last Update: Sep. 5, 2013; Accessed on Apr. 25, 2014.

IBIS Bikes (2012) Ripley 29; Website [Online] Available Web Site: http://www.ibiscycles.com/bikes/ripley_29/; Last Update: Feb. 19, 2014; Accessed on Apr. 25, 2014.

Marin Bikes (2013) IsoTrac Suspension; Website [Online] Available Web Site: http://www.marinbikes.com/us/bikes/feature/isotrac-suspension; Last Update: Sep. 26, 2013; Accessed on Apr. 25, 2014.

English Language Search Report from GB142032.0 dated Jun. 18, 2015.

* cited by examiner

BICYCLE FRAME REAR SUSPENSION WITH FLEXING FRAME SEGMENT

RELATED APPLICATIONS

This application claims priority from U.S. Provisional Patent Application Ser. No. 61/919,833, filed Dec. 23, 2013, entitled "Bicycle Frame Rear suspension with Flexing Frame Segment," which is hereby incorporated by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention is directed toward bicycles, and more particularly toward a bicycle frame rear suspension.

BACKGROUND

Rear suspensions have become commonplace in off-road bicycles such as mountain bikes. Rear suspensions allow the rear wheel to pivot upward relative to a forward portion of the bicycle frame to damp and absorb the impact of off-road features such as rocks commonly found on mountain biking trails. Such rear suspension frames typically include a rigid front frame portion pivotally connected to a rear frame portion functioning as a swing arm pivoting about a pivot or pivots between the front frame portion and the rear frame portion. Typically a spring or shock absorber is connected between the front frame portion and the rear frame portion to bias the rear frame portion to a rest or un-pivoted position relative to the front frame portion and to absorb or damp pivoting of the rear frame portion about the pivot(s) as an obstacle is encountered. One known problem with many rear suspension systems is that as a rider pedals, the shifting of the rider's weight and variations in chain force causes the suspension to bob, a condition commonly known as "pedal bob", wasting rider energy and potentially causing a loss of traction for the rear wheel. In an effort to minimize pedal bob, a variety of bicycle frame rear suspensions have been devised, many of which incorporate a number of pivots and links. These various bicycle frame rear suspensions have varying success in minimizing pedal bob while maintaining pedaling efficiency. However, the additional pivots and links these rear suspensions require add weight and cost to the bicycle frame and create maintenance issues as invariably grit invades the pivots creating annoying creaks and increasing wear of the pivots. Thus, a need exists for a bicycle rear suspension frame which reduces pedal bob and maintains pedaling efficiency while reducing the number of links and pivots in the rear suspension.

The present invention is directed toward overcoming one or more of the problems discussed above.

SUMMARY OF THE EMBODIMENTS

A bicycle frame includes a substantially rigid front frame portion and a substantially rigid rear frame portion. A link is connected to the rear frame portion by a first pivot and to the front frame portion by a second pivot. A rear frame segment is rigidly connected at a first end to the rear frame portion and pivotably connected at a second end to the front frame portion by a third pivot. The rear frame segment is flexible parallel to an axis of the third pivot.

Embodiments may further include a shock absorber pivotably connected between the rear frame portion and the front frame portion to oppose pivoting of the rear frame portion relative to the front frame portion in a clockwise direction about the third pivot. Embodiments may include the first pivot floating in an arc about the second pivot which is fixed relative to the front frame portion as the rear frame portion pivots relative to the front frame portion about the third pivot. The rear frame segment is configured to flex to enable the first pivot to move in the arc about the second pivot as the rear frame segment pivots about the third pivot between a rest position and a fully pivoted position. Embodiments include the rear frame segment behaving as a leaf spring as it flexes, with the rear frame segment being configured to provide a spring force that varies between opposing and promoting pivoting of the rear fame portion about the third pivot as the rear frame portion is pivoted about the third pivot from a rest position to a fully pivoted position. Embodiments include the rear frame segment being integrally formed with the rear frame portion. Embodiments include the rear frame segment being substantially laterally rigid.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
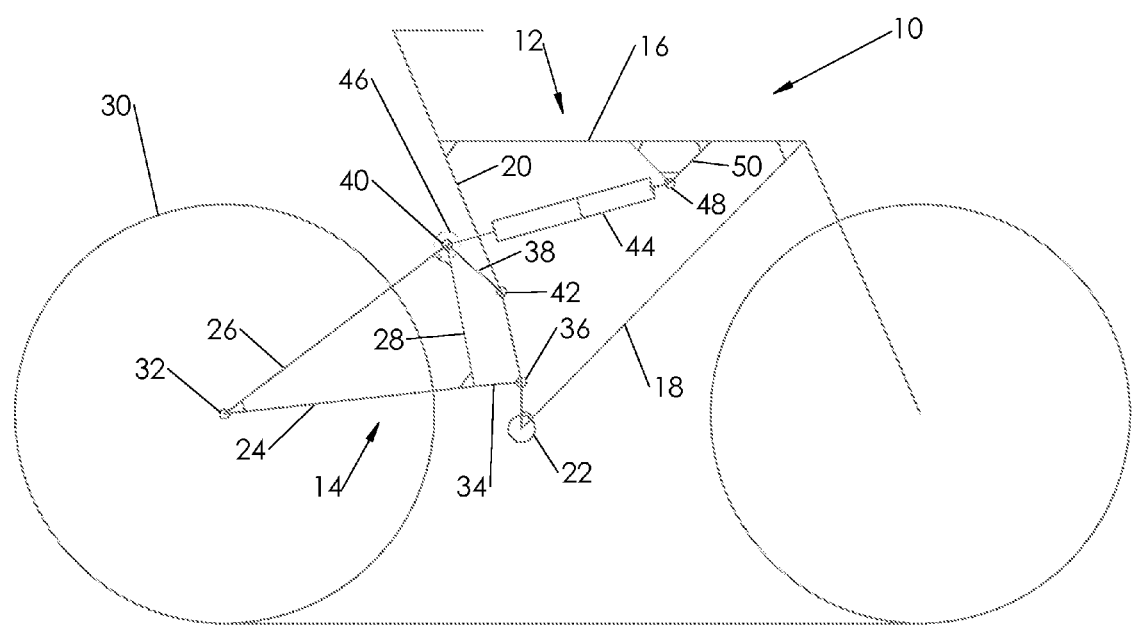
FIG. 1 is a schematic right side elevation view of a bicycle frame having a rear suspension with a flexing frame segment shown in a rest position.

FIG. 1 is a schematic representation of a bicycle frame 10 having a rear suspension with a flexing frame segment. The bicycle frame 10 comprises a substantially rigid front frame portion 12 and a substantially rigid rear frame portion 14. The front frame portion 12 includes a top tube 16 rigidly connected to a down tube 18 and a seat tube 20 which in turn are rigidly connected to each other at a bottom bracket shell 22. As used herein "substantially rigid" means the various frame members are rigidly connected and the various frame members themselves are sufficiently rigid that the frame portion cannot yield or deform significantly under normal usage, wherein the frame portion maintains its shape when under operative loads, for example, the shape depicted in FIG. 1.

The substantially rigid rear frame portion 14 includes a chain stay 24 rigidly connected at a proximal end to a proximal end of a seat stay 26, each of which are rigidly connected to a bridge stay 28 at their distal ends. The chain stay 24 and the seat stay 26 can consist of chain stay and seat stay pairs configured to receive a bicycle wheel 30 therebetween (see FIG. 7). The proximal ends of the chain stay 24 and the seat stay 26 may be rigidly attached to an axle housing 32 which receives an axle of the wheel 30. Alternate embodiments of the front and rear frames are expressly included within the scope of the invention. For example, the front and rear frame portions do not necessarily have to be in the form of a triangle as illustrated herein. The rear frame portion may have any configuration that renders the rear frame substantially rigid so that it acts as a swing arm in the various embodiments disclosed herein.

The rear frame portion 14 further includes a rear frame segment 34 which is fixedly attached to the substantially rigid rear frame. The rear frame segment 34 can be integrally formed with the rear frame, for example, when the rear frame portion 14 is made of a composite material or may be rigidly connected by welding, bolting or otherwise fixedly attached when the rear frame portion 14 is made of metal.

The substantially rigid rear frame portion 14 is attached to the substantially rigid front frame portion 12 in a manner providing the rear suspension. As depicted in FIG. 1, a link 38 extends between a first pivot 40 near the connection between the bridge stay 28 and the seat stay 26 and a second pivot 42 attached to the front frame portion 12 above the bottom pivot 36 and below and in front of the first pivot 40. The rear frame segment 34 is pivotably attached at a third pivot 36 to the seat tube 20 near the bottom bracket shell 22. A shock absorber 44 extends between the substantially rigid front frame portion 12 and rear frame portion 14 and is pivotably connected at a first shock pivot 46 to the substantially rigid rear frame portion 14 proximate the connection of the seat stay 26 and the bridge stay 28 and pivotably connected to the front frame portion at second shock pivot 48 connected to a bracket 50 which is in turn fixedly attached to the top tube 16. Embodiments could substitute a spring or other elastic element for the shock absorber 44, and "shock absorber" is intended herein to include all such substitutes as well as conventional shock absorbers.

In certain embodiments the rear frame segment 34 functions as a leaf spring and is configured to be laterally rigid but flexible parallel to an axis of the third pivot 36. In one embodiment, the rear frame segment 34 may be made of a plate of metal, for example spring steel or titanium. In an embodiment where the rear frame portion 14 is fabricated from composite materials, the rear frame segment 34 may be made of a fiber reinforced composite. The operation of the rear frame segment 34 acting as a leaf spring will be described in greater detail below.

Figure 2:
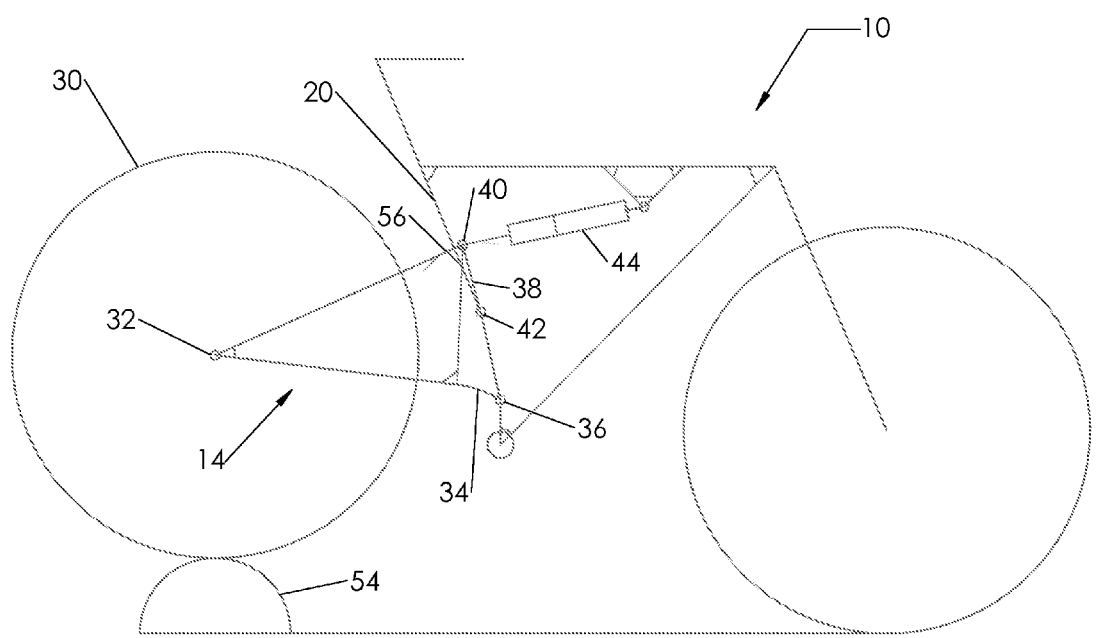
FIG. 2 is a schematic representation of the bicycle frame of FIG. 1 with the rear frame portion partially pivoted clockwise about a pivot relative to the front frame portion.
Figure 4:
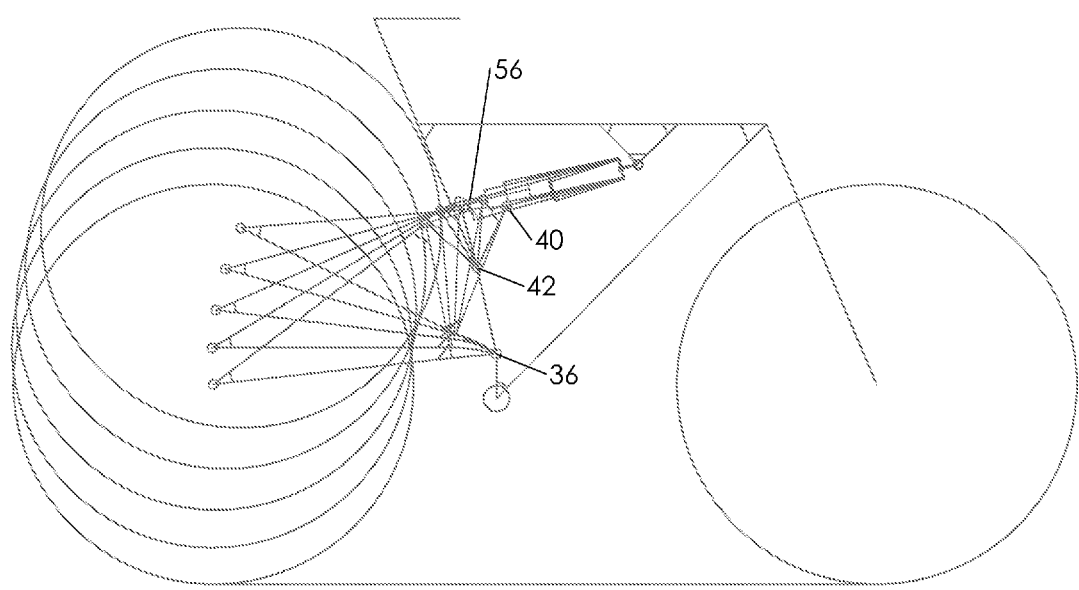
FIG. 4 is a schematic representation of the bicycle frame of FIG. 1 illustrating an arc of travel of a floating pivot as the rear suspension travels from a rest to a fully pivoted position.

FIG. 2 illustrates the bicycle frame 10 of FIG. 1 where the rear wheel 30 encounters an obstacle 54 causing the rear frame portion 14 to pivot clockwise about the third pivot 36 to a partially actuated position. The pivoting of the rear frame portion in turn causes link 38 to pivot clockwise about the second pivot 42. In effect, the second pivot 42 is fixed and the first pivot 40 floats along an arc 56 (see FIG. 4). To enable this movement, the flexible rear frame segment 34 flexes as depicted in FIG. 2. As the effective distance between the first pivot 40 and the third pivot 36 increases from the rest position to the partially actuated position as illustrated in FIG. 2, the flexible frame segment exerts a spring force opposing rotation of the rear frame portion about the third pivot 36.

Figure 3:
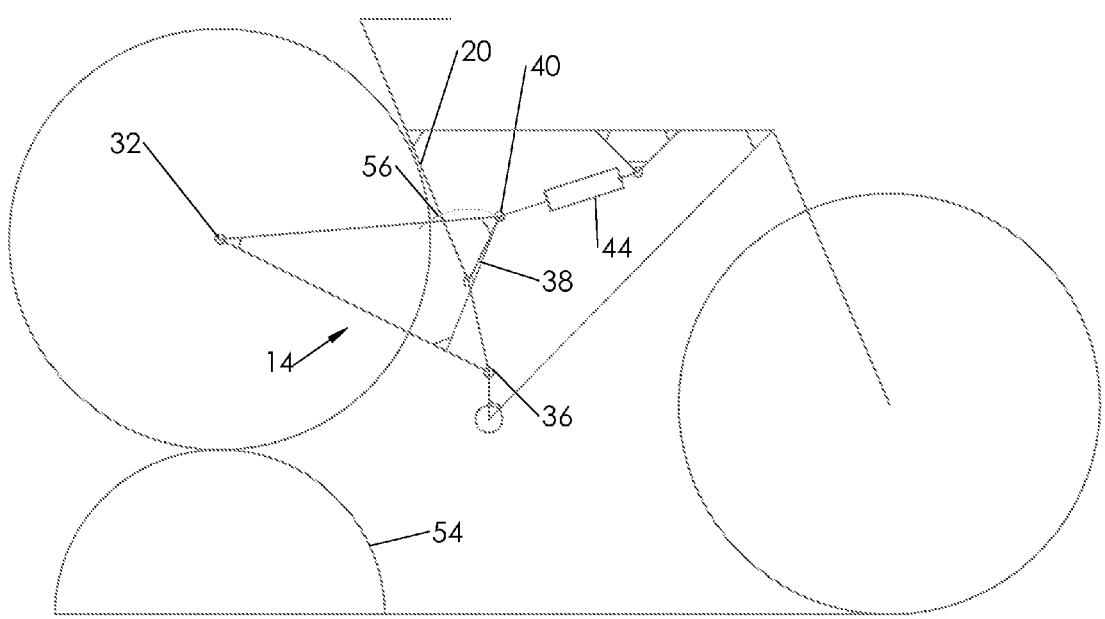
FIG. 3 is a schematic representation of the bicycle frame of FIG. 1 with the rear frame portion in a fully pivoted position about the pivot relative to the front frame portion.

FIG. 3 depicts the bicycle frame 10 where the rear wheel 30 has encountered a larger obstacle 54 and shows the rear frame portion 14 in a fully pivoted position clockwise about the third pivot 36. Here the first pivot 40 has traveled to the fully pivoted end of the arc 56. In this position the flexible rear frame segment 34 is returned to a near-planar configuration as the distance between the first pivot 40 and the third pivot 36 is nearly the same as it is at the start of the arc 56 in a rest position.

Figure 5:
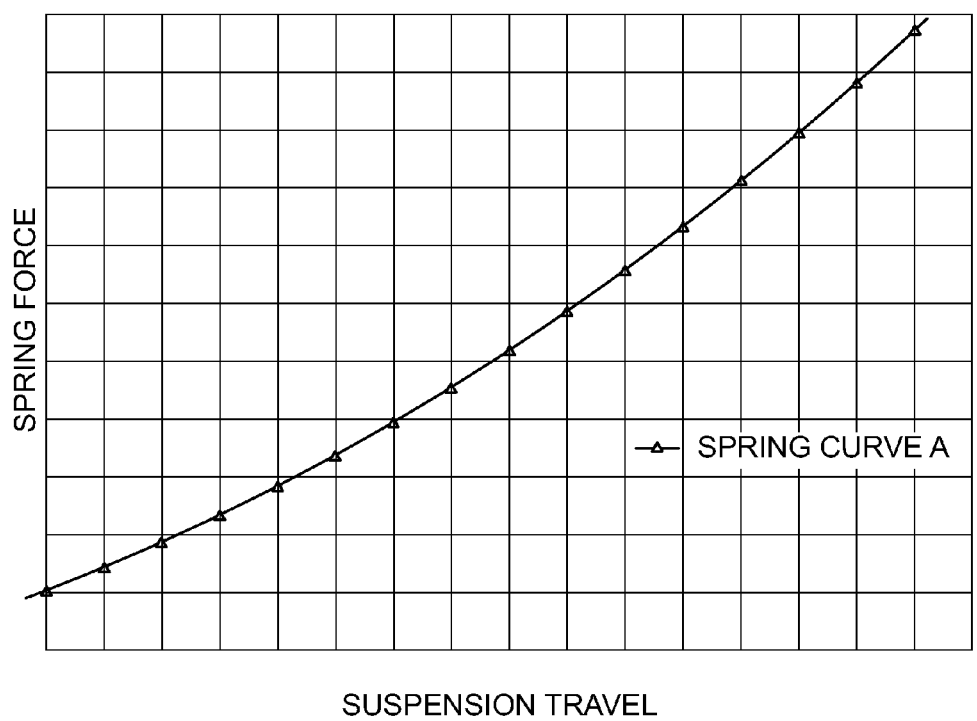
FIG. 5 is a graph representative of spring force versus suspension travel provided by the shock absorber in association with the bicycle frame depicted in FIG. 1.
Figure 6:
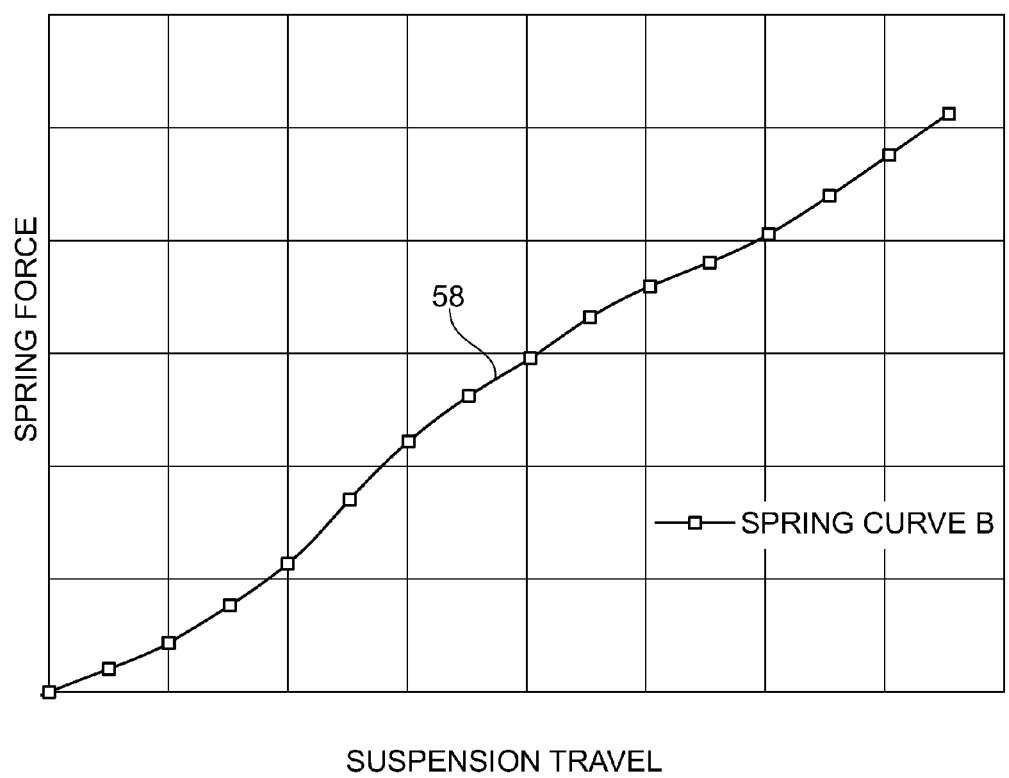
FIG. 6 is a graph representative of spring force versus suspension travel provided by a flexible segment of the rear frame portion of FIG. 1 (which is not necessarily at the same scale as the graph of FIG. 5)

In this embodiment, as the rear frame portion 14 pivots clockwise about the third pivot 36 the shock absorber 44 compresses and applies a spring force opposing clockwise rotation for the rear frame portion. FIG. 5 is a graph representing an anticipated spring curve of spring force applied by the shock absorber 44 as a function of the suspension travel, which herein is defined as the vertical distance traveled by the axle housing 32 as the rear frame portion 14 pivots about the bottom pivot 36. The spring force depicted in FIG. 5 assumes the flexing of the flexible rear frame segment 34 does not result in any spring force. However, as noted above, in certain embodiments the flexing of the rear frame segment 34 does impart a spring force to the suspension. In such embodiments as the flexible rear frame segment 34 flexes as the first pivot 40 travels the arc 56 to the crown of the arc 56, imparting a spring force opposing rotation of the rear frame portion 14 about the third pivot 36 to the point 58 depicted in FIG. 6, which corresponds to a crown of the arc 56 about the second pivot 42. FIG. 5 and FIG. 6 are representative of anticipated spring curves of the respective elements and are not in any particular scale relative to one another. As used herein, "crown" means a point of maximum distance of the first pivot 40 from the third pivot 36. In other embodiments, for example where the pivots of the link 38 are configured such that the first pivot 40 moves in an arc wherein at a mid-point of travel it is at a closest distance from the third pivot 36, the "crown" would correspond that point on the arc of closest distance causing a change in a spring effect provided by the flexible rear frame segment 34. In the embodiment depicted in FIGS. 1-4, after the first pivot 40 crosses the crown and continues along the arc to the fully pivoted position, the flexible rear frame segment 34 provides a spring force that promotes pivoting of the rear frame portion about the third pivot as the flexible rear frame segment 34 straightens until the rear frame portion 14 reaches its fully pivoted position depicted in FIG. 3. The configuration of the pivots and flexible rear frame segment 34 with the geometry illustrated in FIGS. 1-3, along with the flexible frame segment behaving as a leaf spring, has the desirable effect of increasing the spring force at the outset of suspension travel, which helps resist pedal bob as a rider pedals, providing a more efficient pedal stroke. However, as large obstacles 54 are encountered by the rear wheel 30 suspension travel increases resulting in the first pivot 40 traveling along the arc 56 past the crown with respect to the second pivot 42, and thereafter the flexible rear frame segment 34 acts to promote pivoting of the rear frame portion 14 about the third pivot 36 to provide a more plush feel to the user, as is desirable when large obstacles 54 are encountered. This effect can be viewed in the spring curve depicted in FIG. 5 which depicts an effective spring curve provided by the flexible frame segment 34 acting as a leaf spring in the illustrated embodiment.

In the embodiment of the bicycle frame 10 depicted in FIGS. 1-4, the flexible rear frame segment is substantially parallel with an imaginary line between the axle housing 32 (or a junction between the seat stay and the chain stay) and the third pivot 36. Other embodiments could have the rear frame segment 34 at an angle to this imaginary line between the axle housing and the third pivot as desired to provide different suspension effects. Furthermore, as depicted the first pivot 40 attached to the rear frame segment 34 is above and rearward relative to the second pivot 42 attached to the front frame portion 12. Embodiments could have the first pivot 40 below and rearward of the second pivot 42 to vary the spring curve. Embodiments could also include configuration of the pivots and the rear frame segment 34 to provide a spring force opposing rotation of the rear frame portion 14 about the third pivot 36 from a rest position to a fully pivoted position. Embodiments could further include configurations wherein the rear frame segment to provides a spring force promoting rotation of the rear frame portion 14 about the third pivot 36 from a rest position to a fully pivoted position. Embodiments could further include configurations wherein the rear frame segment provides a spring force promoting rotation of the rear frame portion 14 about the third pivot 36 from a rest position a select point along the arc 56 and thereafter a spring force opposing rotation of the rear frame portion 14. These various embodiments will have varying effects on reducing pedal bob as compared to the embodiment described with respect to FIGS. 1-4.

Figure 7:
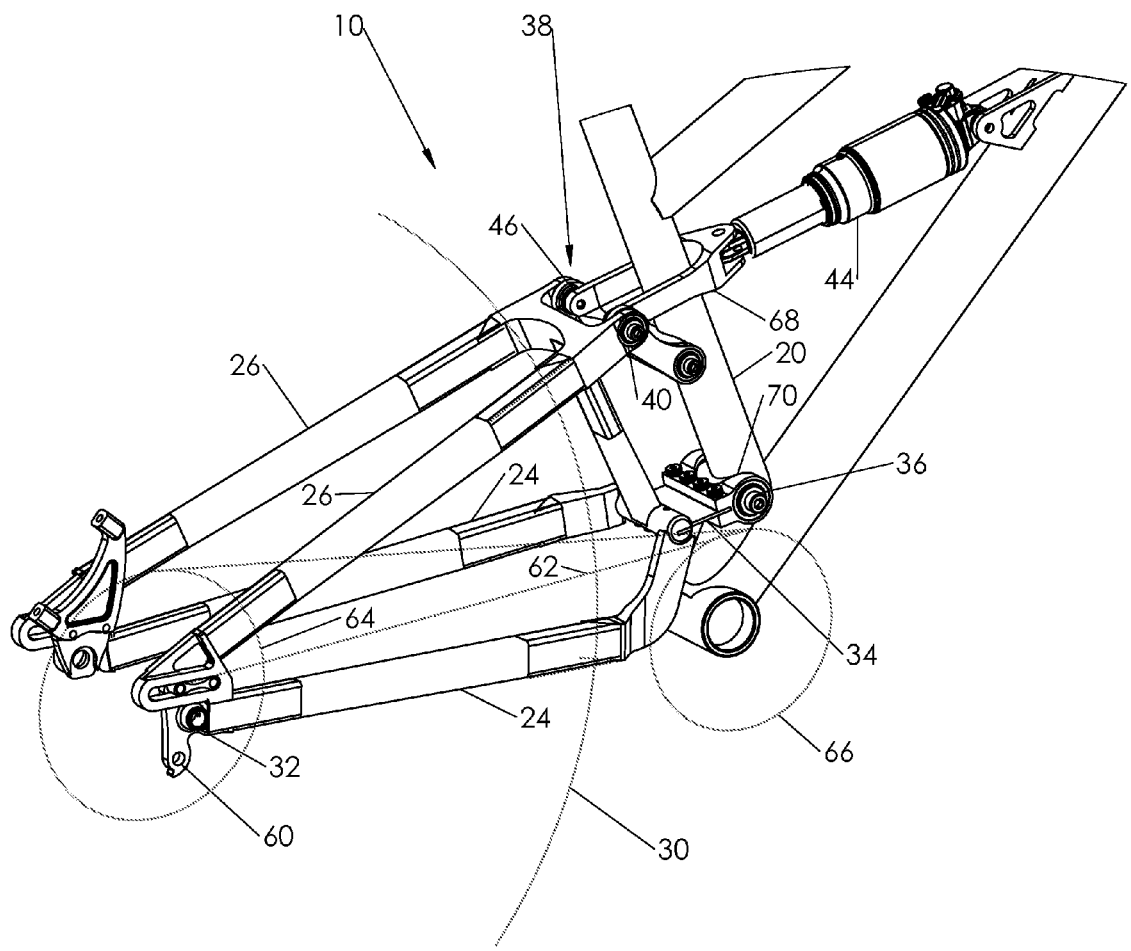
FIG. 7 is a is a perspective view of an embodiment of a bicycle frame of FIG. 1.

FIG. 7 is a perspective view of an embodiment of a bicycle frame 10 having the configuration depicted in FIG. 1 showing the rear frame portion 14 comprising a pair of spaced seat stays 26 and a pair of spaced chain stays 24 configured to receive a bicycle wheel 30 therebetween. FIG. 6 further illustrates the axle housing 32 for receiving an axle of the wheel 30 and a derailleur hanger 60 for attaching a derailleur for shifting the position of a chain 62 along a rear cassette 64. FIG. 6 also depicts a front chain ring 66 which is attached a crank (not shown) that rotates about a bottom bracket (not shown) received in the bottom bracket shell 22. In the embodiment illustrated in FIG. 6, the link 38 comprises a pair of link arms attached to distal ends of the seat stays 26 at the first pivot 40 and the shock absorber 44 is attached to the first shock pivot 46 by a yoke 68 bridging the seat tube 20. In this embodiment the flexible rear frame segment 34 is a metal plate fixedly attached to the rear frame portion 12 and bolted to a pivoting bracket 70 pivotably connected to the seat tube 20 by third pivot 36.

Figure 8:
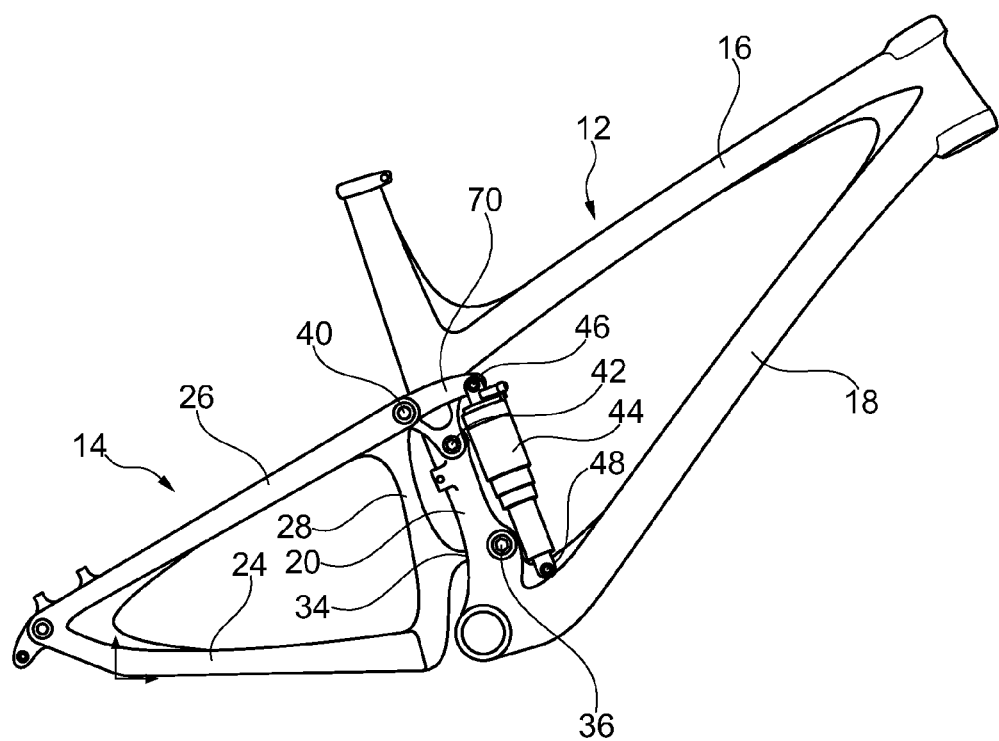
FIG. 8 is a right side view of an alternate embodiment of a bicycle frame having a rear suspension with a flexing frame segment.

FIG. 8 is an alternate embodiment of a bicycle frame having a rear suspension with a flexing frame segment. In this embodiment the link 38 is in the form of a bell crank 70 which is a single integral piece and the shock 44 is disposed parallel to the seat tube 20, with all like elements of the embodiment of FIG. 1 having like reference numbers in the embodiment of FIG. 8.

The description of the various embodiments has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. A bicycle frame comprising:
    a substantially rigid front frame portion;
    a substantially rigid rear frame portion;
    a link connected to the rear frame portion by a first pivot and connected to the front frame portion by a second pivot;
    a rear frame segment rigidly connected at a first end to the rear frame portion and pivotably connected at a second end to the front frame portion by a third pivot, the rear frame segment being flexible parallel to an axis of the third pivot;
    wherein the first pivot floats in an arc about the second pivot which is fixed relative to front frame portion as the rear frame portion pivots relative to the front frame portion about the third pivot, and wherein the rear frame segment flexes to enable the first pivot to move in the arc about the second pivot as the rear frame segment pivots about the third pivot between a rest position and a fully pivoted position; and
    wherein the rear frame segment behaves as a leaf spring as it flexes, the rear frame segment and the pivots being configured so that the rear frame segment provides a spring force that varies between opposing and promoting pivoting of the rear frame portion about the third pivot as the rear frame portion is pivoted about the third pivot between a rest position and a fully pivoted position.

2. The bicycle frame of claim 1 wherein the rear frame segment comprises a leaf spring.

3. The bicycle frame of claim 1 wherein the substantially rigid rear frame portion comprises a seat stay, a chain stay and a bridge stay, the seat stay and the chain stay being substantially rigidly connected together at their proximal ends and each being substantially rigidly connected to the bridge stay, and the flexible rear frame segment being substantially parallel and aligned with an imaginary line between the junction between the seat stay and the chain stay and the third pivot.

4. The bicycle frame of claim 1 wherein the seat stay and the chain stay comprise forked stay pairs configured to receive a bicycle wheel therebetween.

5. The bicycle frame of claim 1 further comprising a shock absorber pivotably connected between the link and the front frame portion to oppose pivoting of the rear frame portion relative to the front frame portion in a clockwise direction about the third pivot.

6. The bicycle frame of claim 1 wherein the rear frame segment and the pivots are configured to provide a spring force opposing rotation of the rear frame portion about the third pivot from a rest position to a point along the travel of the arc of the first pivot about the second pivot and to thereafter provide a spring force promoting rotation of the rear frame portion about the third pivot to a fully pivoted position.

7. The bicycle frame of claim 1 wherein the rear frame segment is integrally formed with the rear frame portion.

8. The bicycle frame of claim 1 wherein the rear frame segment comprises a leaf spring configured to be substantially laterally rigid.

9. The bicycle frame of claim 8 wherein the leaf spring is made of a metal.

10. The bicycle frame of claim 8 wherein the leaf spring is made of composite material.

* * * * *